(12) United States Patent  (10) Patent No.: US 7,175,198 B2
Nakayasu et al.  (45) Date of Patent: Feb. 13, 2007

(54) INFLATOR

(75) Inventors: Masayuki Nakayasu, Himeji (JP); Nobuyuki Katsuda, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 141 days.

(21) Appl. No.: 10/643,908

(22) Filed: Aug. 20, 2003

(65) Prior Publication Data

US 2004/0207187 A1  Oct. 21, 2004

Related U.S. Application Data

(60) Provisional application No. 60/404,925, filed on Aug. 22, 2002.

(30) Foreign Application Priority Data

Aug. 20, 2002 (JP) .............................. 2002-239265

(51) Int. Cl.
B60R 21/268 (2006.01)
(52) U.S. Cl. ...................................... 280/736; 280/737
(58) Field of Classification Search .............. 280/737, 280/736, 740, 741, 742; 137/68.13, 68.23, 137/68.25, 68.26, 68.28
See application file for complete search history.

(56) References Cited

U.S. PATENT DOCUMENTS

| 2,947,315 | A | * | 8/1960 | Connell ................... 137/68.13 |
| 3,642,304 | A | * | 2/1972 | Johnson et al. ............. 280/737 |
| 3,944,249 | A | * | 3/1976 | Smith et al. ................ 280/742 |
| 4,203,616 | A |   | 5/1980 | Okada |
| 5,588,670 | A | * | 12/1996 | Storey et al. ............... 280/737 |
| 5,593,180 | A | * | 1/1997 | Cuevas et al. .............. 280/737 |
| 5,601,309 | A |   | 2/1997 | Bender et al. |
| 5,826,904 | A |   | 10/1998 | Ellis et al. |
| 5,854,441 | A | * | 12/1998 | Metzger ..................... 280/737 |
| 6,247,725 | B1 |   | 6/2001 | Möller |
| 6,502,856 | B1 |   | 1/2003 | Shaklik et al. |
| 6,572,141 | B2 |   | 6/2003 | Nanbu |
| 2002/0036399 | A1 |   | 3/2002 | Nanbu |
| 2002/0185849 | A1 |   | 12/2002 | Sawa et al. |
| 2003/0029349 | A1* |   | 2/2003 | Katsuda et al. ............. 102/530 |
| 2003/0111832 | A1 |   | 6/2003 | Kelley et al. |

FOREIGN PATENT DOCUMENTS

| EP | 1075988 A2 | 2/2001 |
| EP | 1223085 A2 | 7/2002 |
| EP | 1262380 A2 | 12/2002 |
| JP | 3044475 U | 10/1997 |
| JP | 2002-172995 A | 6/2002 |
| JP | 2002-362300 A | 12/2002 |
| WO | WO-95/02526 A1 | 1/1995 |
| WO | WO 99/12775 A1 | 3/1999 |

* cited by examiner

*Primary Examiner*—David R. Dunn
(74) *Attorney, Agent, or Firm*—Birch, Stewart, Kolasch & Birch, LLP

(57) ABSTRACT

The present invention provides an inflator reduced in size and improved in rupturability of a rupturable plate. A rupturable plate 29 is fixed between a gas introducing chamber 22 and an igniter accommodating chamber 26, and the central axes of an igniter 24 and the rupturable plate 29 are coincident with each other. For this reason, rupturability of the rupturable plate can be improved at the time of actuation.

17 Claims, 6 Drawing Sheets

INFLATOR

This Nonprovisional application claims priority under 35 U.S.C. § 119(e) on U.S. Provisional Application No(s). 60/404,925 filed on Aug. 22, 2002 and under 35 U.S.C. § 119(a) on patent application Ser. No(s). 2002-239265 filed in Japan on Aug. 20, 2002, the entire contents of which are hereby incorporated by reference.

TECHNICAL FIELD WHERE THE INVENTION BELONGS

The present invention relates to an inflator suitable for an air bag system for an automobile, and an air bag system using the same.

BACKGROUND ART

As an inflator for an inflating type safety system of an automobile, in order to optimally protect a passenger in accordance with a position of a seat in a vehicle such as a driver side, a passenger side and the like, there are generally used various inflators. As the inflator, ones using a pressurized gas such as argon, helium or the like, as inflating means for an air bag are known. In such an inflator, since outflow of a pressurized gas is started by rupturing of a rupturable plate and an air bag is inflated and developed at the end, it becomes important to improve rupturability of the rupturable plate for improving an operational reliability of the inflator. Further, in order to satisfy a demand for size-reduction and weight-reduction, it is necessary to simplify a structure of the inflator as much as possible and satisfy demands for such as simplification of a manufacturing process, a reliability of an operation over a long period.

An invention relating to a stored gas inflator is disclosed in JP-A 2002-172995. In FIG. 2 of this invention, a main chamber 20 and a small chamber 18 are formed, a communication hole 26 and a small hole 28 are formed in a separation wall 24 positioned between these chambers, and a gas ejecting hole 14 and the communication hole 26 formed in the small chamber 18 are respectively mounted with rupturable plates (burst shims) 16 and 22. An initiator 30 is disposed in a pressurized atmosphere inside the small chamber 18, and there is a description that the rupturable plate can be ruptured even by an igniter with a small output in the specification of the publication. In this inflator, however, there are problems as follows.

In this inflator, in order to maintain a pressurized atmosphere inside the small chamber 18, it is necessary to seal the initiator 30 securely in order to keep air-tightness, not to let the gas inside the small chamber 18 leak from the initiator 30. However, in view of charging the gas with a high pressure, it is difficult to maintain the air-tightness over a period of 10 years or more which is a life period of a vehicle.

Further, in the paragraph 24 of the specification, there is a description that "P2 is approximately equal to (P1−Pm) or slightly smaller than the same". Here, P2 represents a rupturing pressure for the rupturable plate 22, P1 represents a rupturing pressure for the rupturable plate 16, and Pm represents a charging pressure of a gas charged in the small chamber 18 and the main chamber 20. According to the contents of the disclosure, the temperature inside the small chamber 18 and the number of moles of the gas rise according to actuation of the initiator 30. Accordingly, when the pressure in the small chamber 18 becomes higher than that in the main chamber 20, there are no problems in that two rupturable plates 16 and 22 are simultaneously ruptured.

However, if the rupturable plate 22 is ruptured first, the pressure inside the small chamber 18 escapes into the main chamber 20, so that a shock wave generated by the initiator 30 hardly acts on the rupturable plate 16. As a result, the rupturable plate 16 is not ruptured, and the air bag can not be inflated normally.

Furthermore, even though the initiator 30 is activated, there is not the rupturable plates 16 and 22 in extension line of a direction in which the shock wave travels, and accordingly, reliability is definitely poor when it is considered in view of rupture of the ruptrable plate.

DISCLOSURE OF THE INVENTION

An object of the present invention is to provide an inflator which can be activated securely over a long period and in that an assembling work and a mounting work can also be facilitated.

The invention described in claim 1 provides, as means for solving the above problem, an inflator comprising a cylindrical inflator housing having one end closed and the other end opened, and a diffuser portion connected to the opening portion of the inflator housing and having a gas discharging hole, wherein a pressurized gas is charged in the inflator housing, a flat plate-like rupturable plate which closes a gas discharging passage reaching the gas discharging hole and whose portion including the center is ruptured to open the gas discharging passage at the time of activation is provided inside the diffuser portion, and an igniter for rupturing the rupturable plate is further provided at a position orthogonal to the axial direction of the inflator housing such that an actuating portion of the igniter opposes the center of the ruptruable plate inside the diffuser portion.

Here, the word "orthogonal" means 90°, but it includes a non-orthogonal case, for example, such a case that an igniter is mounted obliquely with an inclination of within ±10° to the axial direction of the inflator housing.

By setting the arrangements of the igniter and the inflator housing, and the igniter and the rupturable plate in the above manner, the inflator itself can be made compact. Further, rupturability of the rupturable plate can be enhanced, and, by setting a drawing-out direction of a lead wire in the opposite direction to the air bag but in the axial direction of the inflator housing, the lead wire does not interfere with the air bag, and thereby, a mounting work of the inflator can be facilitated.

In the above-described invention, it is preferable that the rupturable plate and the igniter are arranged such that the central axis of the rupturable plate and the central axis of an operation portion of the igniter are coincident with each other.

The igniter has an operation portion in which a priming is usually disposed at a distal end portion, and the priming is ignited and burned by a current conduction. As a result, a shock wave, a flame, a gas and the like are generated to rupture the rupturable plate. For this reason, since the shock wave, the flame, and the gas travel in the direction of the central axis of the igniter, rupturability of the rupturable plate can be improved by making the central axes of the rupturable plate and the igniter coincide with each other. Incidentally, as the rupturable plate, a flat plate (for example, a disk) is used. However, the rupturable plate deforms into a bowl-like shape with a pressure caused by the pressurized gas, and therefore, the apex of the bowl-like rupturable plate (the apex of the convex portion, which corresponds the center of the rupurable plate) and the central axis of the operation portion of the igniter are arranged to meet each other.

In an inflator of the invention described in claim 3, it is preferable that the diffuser portion has a gas introducing chamber for introducing the pressurized gas inside the inflator housing, and an igniter accommodating chamber for accommodating the igniter and the gas discharging hole, the respective chambers define the gas discharging passage, and the pressurized gas inside the inflator housing is ejected from the gas discharging hole at the time of activation, the gas introducing chamber is a space formed in the axial direction of the inflator housing and has an opening portion which is in communication with the inflator housing, and the igniter accommodating chamber is a space formed in the direction orthogonal to the axial direction of the inflator housing and has an opening portion before mounting the igniter and the rupturable plate is inserted from the opening portion of the igniter accommodating chamber and mounted in the igniter accommodating chamber side of the gas discharging passage which communicates the igniter accommodating chamber with the gas introducing chamber.

In this inflator, the pressurized gas charged into the inflator housing is discharged from the gas discharging hole after passing through the inflator housing, the gas introducing chamber and the igniter accommodating chamber. The inflators described below are the same as the above.

In this inflator, the igniter accommodating chamber has an opening portion, the rupturable plate is inserted and fixed from the opening portion, and the igniter can further be inserted and fixed, so that an assembling work is facilitated. In order to fix the rupturable plate, such a method can be applied that a step portion is provided in the gas discharging passage connecting the gas introducing chamber and the igniter accommodating chamber and the rupturble plate is welded and fixed at the step portion in the igniter accommodating chamber side. Incidentally, the igniter can be fixed by crimping a peripheral edge of the opening portion after the igniter is inserted from the opening portion of the igniter accommodating chamber.

Further, by arranging the inflator housing, and the gas introducing chamber, the igniter accommodating chamber and the gas outflow chamber which constituent the diffuser portion, as the above, the central axes of the inflator housing and the diffuser portion do not coincide with each other, but the distance between the two central axes becomes shorter, so that the whole size of the inflator can be made compact.

In an inflator of the invention described in claim 4, it is preferable that the diffuser portion has a gas introducing chamber for introducing the pressurized gas inside the inflator housing, an igniter accommodating chamber for accommodating the igniter and the gas discharging hole, the respective chambers define the gas discharging passage, and the pressurized gas inside the inflator housing is ejected from the gas discharging hole at the time of activation;

the gas introducing chamber is a space formed in the axial direction of the inflator housing and has an opening portion which is in communication with the inflator housing, and the igniter accommodating chamber is a space formed in the direction orthogonal to the axial direction of the inflator housing and has an opening portion before mounting the igniter, and a cylindrical cup with a bottom is inserted into the gas introducing chamber such that an opening portion thereof is directed to the inflator housing, and a side surface of the cup forms the rupturable plate which closes the gas discharging passage communicating the igniter accommodating chamber with the gas introducing chamber.

In this inflator, it is preferable that a shape of the gas introducing chamber and a shape of the cup are in the same shape, and a closed end surface (bottom) of the cup abuts against a closed end surface of the gas introducing chamber.

In this inflator, since the side surface of the cup forms the rupturable plate, a mounting work of the rupturable plate is made easier than a case of welding and fixing a flat plate. In particular, when the gas introducing chamber and the cup have the same shape, the cup is pressed by the pressurized gas and can hardly move. Further, since part of the integrally formed cup side surface forms the rupturable plate, sealing of the pressurized gas is made more securely as compared with the case of the rupturable plate made of a flat plate (for example, a disk), and a fixing work of the cup is made easy. In order to fix the cup, such a method can be applied that, after the cup is inserted into the gas introducing chamber, a peripheral edge in the opening portion of the cup (preferably, with a flange) is welded and fixed at a step portion of an inlet of the gas introducing chamber.

Further, by arranging the inflator housing, and the gas introducing chamber and the igniter accommodating chamber which constituent the diffuser portion, as the above, the central axes of the inflator housing and the diffuser portion do not coincide with each other, but the distance between the two central axes becomes shorter, so that the whole size of the inflator can be made compact.

In an inflator described in claim 5, it is preferable that the diffuser portion has a gas introducing chamber for introducing the pressurized gas inside the inflator housing, an igniter accommodating chamber for accommodating the igniter and the gas discharging hole, the respective chambers define the gas discharging passage, and the pressurized gas inside the inflator housing is ejected from the gas discharging hole at the time of activation, the gas introducing chamber is a space formed in the a direction orthogonal to the axial direction of the inflator housing and has an opening portion which in communication with the inflator housing, and the igniter accommodating chamber is a space formed in the direction orthogonal to the axial direction of the inflator housing and has an opening portion before mounting the igniter, and the rupturable plate is inserted from the gas introducing chamber and is mounted in the gas introducing chamber side of the gas discharging passage which communicates the igniter accommodating chamber with the gas introducing chamber.

In this inflator, since the gas introducing chamber and the igniter accommodating chamber are connected in the same direction, the rupturable plate can be inserted from the opening portion of the gas introducing chamber and fixed, so that an assembling work is facilitated. In order to fix the rupturable plate, such a method can be applied that a step portion is provided in the gas discharging passage connecting the gas introducing chamber and the igniter accommodating chamber and the rupturable plate is welded and fixed at the step portion in the gas introducing chamber side.

Then, by fixing the rupturable plate from the gas introducing chamber side in this manner, a peripheral edge portion of the welded and fixed rupturable plate resists against the pressure of the pressurized gas, and therefore, the rupturable plate never peels off because of decrease in a fixing strength of the rupturable plate caused by the pressure of the pressurized gas.

Further, by arranging the inflator housing, and the gas introducing chamber, the igniter accommodating chamber and the gas outflow chamber which constituent the diffuser portion, as the above, the central axes of the inflator housing and the diffuser portion do not coincide with each other, but the distance between the two central axes becomes shorter, so that the whole size of the inflator can be made compact.

In an inflator described in claim 6, it is preferable that the diffuser portion has a gas introducing chamber for introducing the pressurized gas inside the inflator housing, an igniter accommodating chamber for accommodating the igniter and the gas discharging hole, the respective chambers define the gas discharging passage, and the pressurized gas inside the inflator housing is ejected from the gas discharging hole at the time of activation, the gas introducing chamber is a space formed in the axial direction of the inflator housing and has an opening portion which in communication with the inflator housing, and the igniter accommodating chamber is a space formed in the direction orthogonal to the axial direction of the inflator housing and has an opening portion before mounting the igniter, and a substantially cylindrical retainer for holding the igniter is inserted and fixed inside the igniter accommodating chamber, and the rupturable plate is mounted from the outside of an opening portion in one end of the retainer positioned in the gas discharging passage communicating the igniter accommodating chamber with the gas introducing chamber.

In this inflator, the rupturable plate is welded and fixed from the outside of the opening portion in one end of the retainer for holding the igniter. Thereby, the rupturable plate can be welded and fixed in a stage prior to inserting of the retainer into the igniter accommodating chamber, a welding and fixing work is made still easier as compared with the cases of the above respective inflators.

The retainer fixed with the rupturable plate is inserted into the igniter accommodating chamber such that a portion of the retainer which is attached with the rupturable plate is positioned in the gas introducing chamber side. Then, the peripheral edge portion of the rupturable plate or one end of the retainer which is attached with the rupturable plate is made to contact with the gas discharging passage (preferably, it is made to pressure-contact with the step portion formed on the gas discharging passage), and the contacted portion is resistance-welded, so that an air tightness in the gas introducing chamber can be ensured an air tightness in the gas introducing chamber can be obtained. In this state, finally, the igniter is fixed by inserting the igniter into the retainer and crimping the peripheral edge in the opening portion of the igniter accommodating chamber.

Further, by arranging the inflator housing, and the gas introducing chamber and the igniter accommodating chamber which constituent the diffuser portion, as the above, the central axes of the inflator housing and the diffuser portion do not coincide with each other, but the distance between the two central axes becomes shorter, so that the whole size of the inflator can be made compact.

In an inflator described in claim 7, it is preferable that the diffuser portion has a gas introducing chamber for introducing the pressurized gas inside the inflator housing, an igniter accommodating chamber for accommodating the igniter and the gas discharging hole, the respective chambers define the gas discharging passage, and the pressurized gas inside the inflator housing is ejected from the gas discharging hole at the time of activation, the gas introducing chamber is a space formed in the axial direction of the inflator housing and has an opening portion which in communication with the inflator housing, and the igniter accommodating chamber is a space formed in the direction orthogonal to the axial direction of the inflator housing and has an opening portion communicating with the outside of the inflator before mounting the igniter, and the rupturable plate is fixed to one surface of an annular fixture, and the annular fixture is fixed to the gas discharging passage, which communicates the igniter accommodating chamber with the gas introducing chamber, such that the one surface is directed to the gas introducing chamber.

It is desirable that the annular fixture is provided with an annular projecting portion serving as a welding portion for convenience at the time of being welded and fixed to the gas discharging passage by resistance-welding.

In this inflator, by using the annular fixture, the annular fixture can be welded and fixed inside the diffuser portion after the annular fixture having the rupturable plate welded and fixed is inserted into the diffuser portion. Therefore, the case of welding and fixing a thicker annular fixture inside the diffuser portion can make a welding work easier as compared with the case of welding and fixing a thin disk-like rupturable plate inside the diffuser portion.

Further, since the fixture is inserted from the opening portion of the igniter accommodating chamber into the diffuser portion such that a side of the fixture which is mounted with the rupturable plate is directed to the gas introducing chamber, a peripheral edge portion of the welded and fixed rupturable plate resists against the pressure of the pressurized gas, so that the rupturable plate never peels off because of decrease in a fixing strength of the rupturable plate caused by the pressure of the pressurized gas.

In an inflator described in claim 8, it is preferable that the diffuser portion has a gas introducing chamber for introducing the pressurized gas inside the inflator housing, an igniter accommodating chamber for accommodating the igniter and the gas discharging hole, the respective chambers define the gas discharging passage, and the pressurized gas inside the inflator housing is ejected from the gas discharging hole at the time of activation, the gas introducing chamber is a space formed in the axial direction of the inflator housing and has an opening portion which in communication with the inflator housing and an opening portion which in communication with the outside of the inflator, before mounting the rupturable plate, and the igniter accommodating chamber is a space formed in the direction orthogonal to the axial direction of the inflator housing and has an opening portion communicating with the outside of the inflator before mounting the igniter, and the rupturable plate is inserted from the opening portion of the gas introducing chamber which is in communication with the outside of the inflator and is mounted in the gas introducing chamber side of the gas discharging passage which communicates the igniter accommodating chamber with the gas introducing chamber, and the opening portion of the gas introducing chamber which is in communication with the outside of the inflator is closed by a lid portion.

By providing the communication hole which is in communication with the outside of the inflator in the gas introducing chamber in this manner, it is made easy to insert the rupturable plate from the gas introducing hole to fix the same. Further, by arranging the gas introducing chamber and the igniter accommodating chamber in the above manner, a distance between the central axis of the inflator housing and the central axis of the diffuser portion can be smaller, so that the inflator can be made compact.

In the respective inventions described above, it is preferable that a lead wire which transmits an actuation signal to the igniter via a connector is connected to the igniter, and a direction in which the lead wire extends is different from the direction of mounting the air bag but it is the axial direction of the inflator housing.

An inflator described in claim 10 comprises a cylindrical housing which has an opening portion at one end and is closed at the other end, provided in the vicinity of the closed surface with a gas outflow chamber having a second gas discharging hole, and the gas outflow chamber is connected to a gas discharging hole at the opening portion of the cylindrical housing and is formed in the axial direction of the inflator housing.

In this inflator, the pressurized gas charged in the inflator housing is discharged from the second gas discharging hole after passing through the inflator housing, the gas introducing chamber, the igniter accommodating chamber, the gas discharging hole and the gas outflow chamber. By providing such a gas outflow chamber, a mounting work of an air bag to the inflator is facilitated.

In the above invention, it is preferable that plural second gas discharging hole are formed on a side surface of a gas outflow passage at equal intervals. By forming the gas discharging holes in this manner, even if the pressurized gas is ejected from the gas discharging holes by actuation of the inflator due to a fire or the like during transportation or storage of the inflator, the inflator is prevented from jumping out like a rocket. For example, when there is only a single gas discharging hole, the inflator itself jumps out like a rocket by ejection of the pressurized gas, which is very dangerous.

An invention described in claim 12 provides, as one means for solving the problem, an air bag system comprising actuation signal-outputting means including an impact sensor and a control unit, and a module case accommodating an inflator according to any one of claim 1 to 11 and an air bag.

According to the inflator of the present invention, an inflator assembling work, an assembling work of an air bag system and a mounting work of the air bag system to a vehicle are facilitated. Further, an inflator itself can be reduced in size, and rupturability of a rupturable plate can be improved at the time of actuation of the inflator.

DESCRIPTION OF REFERENCE NUMERALS

Figure 1:
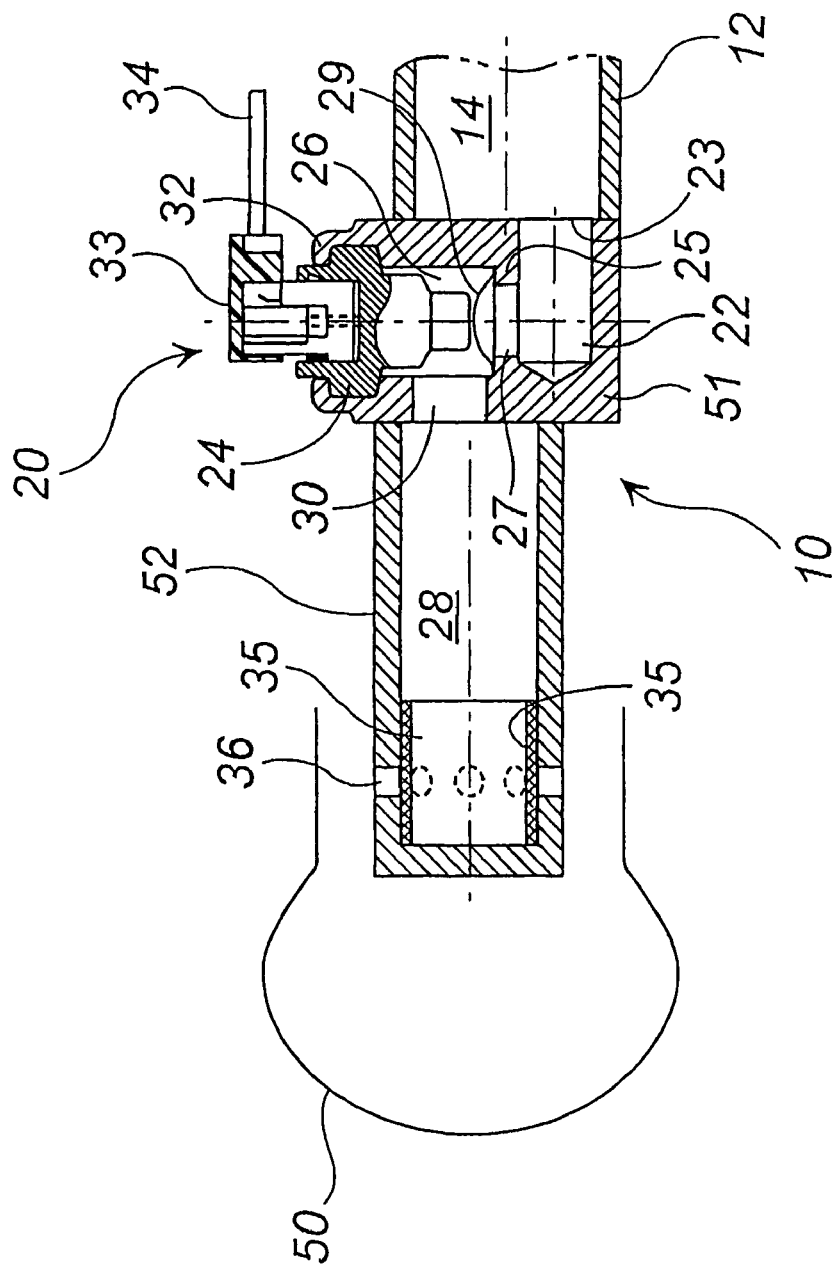
FIG. 1 is a sectional view of one embodiment of an inflator in the axial direction.

10, 100, 200, 300, 400, and 500 inflator
12 inflator housing
20 diffuser portion
22 gas introducing chamber
24 igniter
26 igniter accommodating chamber
28 gas outflow chamber
29 rupturable plate
30 gas discharging hole

PREFERRED EMBODIMENTS OF THE INVENTION (1) Embodiment 1

One embodiment will be explained with reference to FIG. 1. FIG. 1 is a partial sectional view of an inflator 10 in the axial direction.

A cylindrical inflator housing 12 has an opening portion at one end and the other end closed. A pressurized medium comprising an inert gas such as argon or helium, or a nitrogen gas is charged into the inner space 14 at the maximum pressure of about 70,000 kPa.

The inflator housing 12 can be manufactured by swaging or spinning a pipe, or alternatively, an existent gas tank can be used directly. In case of swaging or spinning a pipe, the pipe has to be closed to such a state that a thin hole serving as a charging hole for a pressurized medium is left at one end of the pipe.

After the inflator housing 12 is connected to the diffuser portion 20, a pressurized gas is charged from a clearance between a thin hole provided on a periphery or a closed end surface of the inflator housing 12 and a sealing pin inserted therein, and then, the sealing pin is welded to the inflator housing 12 to close the housing completely.

The diffuser portion 20 is connected to an opening portion of the inflator housing 12, and it comprises a gas introducing chamber 22, which introduces the pressurized gas inside the inflator housing 12, and an igniter accommodating chamber 26 which accommodates an igniter 24 and has a gas discharging hole 30.

In the diffuser portion 20, outer shells of the gas introducing chamber 22 and the igniter accommodating chamber 26 are formed by a single substantially cylindrical housing (a first housing 51), but the outer shells can be formed by different housings for the respective chambers.

The inflator housing 12 and the diffuser portion 20 are welded and fixed to each other at a contacting portion of a peripheral edge portion in the opening portion of the inflator housing 12 and the first housing 51.

Since the gas introducing portion 22 is a cylindrical space formed in the same direction as the central axis of the inflator housing 12, and it is in communication with an inner space 14 at the opening portion 23, the pressurized gas also flows in the gas introducing chamber 22.

The igniter accommodating chamber 26 is formed in a direction orthogonal to the axial direction of the inflator housing 12, and is provided with the gas discharging hole 30. Further, the igniter accommodating chamber 26 has an opening portion for inserting the igniter 24 before the igniter 24 is mounted.

A step portion 25 having a circular opening portion 27 is provided in a gas discharging passage between the gas introducing chamber 22 and the igniter accommodating chamber 26, and a disk-like rupturable plate 29 is mounted to the step portion 25 in the igniter accommodating chamber 26 side.

The rupturable plate 29 is inserted from the opening portion of the igniter accommodating chamber 26 and its peripheral edge portion is welded and fixed to the step portion 25. Since the igniter accommodating chamber 26 has the opening portion in this manner, the rupturable plate 29 can be inserted and fixed from the opening portion and the igniter 24 can further be inserted and fixed, thereby, facilitating an assembling work.

Since a circular opening portion 27 is closed by the rupturable plate 29, movement of the pressurized gas from the gas introducing chamber 22 to the igniter accommodating chamber 26 is blocked before actuation of the inflator 10.

The rupturable plate 29 has a disk-like shape before it is mounted, but it receives a pressure of the pressurized gas after being mounted, and deforms into a bowl-like shape projecting toward the igniter accommodating chamber 26 as shown in the drawing. An apex of the projecting portion corresponds to the center of the rupturable plate 29 and a portion of the rupturable plate including the center is ruptured to open the closed gas discharging passage.

The igniter 24 is mounted inside the igniter accommodating chamber 26, and the igniter 24 is inserted from the opening portion, and then, the igniter 24 is fixed by crimping a peripheral edge 32 of the opening portion.

The igniter 24 is mounted such that it is orthogonal to the axial direction of the inflator housing 12 and the central axis of an operation portion in the igniter 24 and the central axis (the axis passing through the projecting apex portion) of the rupturable plate 29 are coincident with each other. Since the operation portion of the igniter 24 and the central portion of the rupturable plate 29 exactly oppose each other, a shock wave, a flame and a gas concentrate on the central portion of the rupturable plate 29 at the time of actuation of the igniter 24, and thereby, rupturability of the rupturable plate 29 becomes very high.

A connector 33 is fitted to the igniter 24, and a lead wire 34 for transmitting an actuation signal and a current to the igniter 24 is connected to the connector 33. A direction in which the lead wire 34 extends is different from a mounting direction of the air bag 50, but it is the axial direction of the inflator housing 12.

As described in the above, in the inflator 10, the extending direction of the lead wire 34 can be restricted, and therefore, the air bag 50 does not interfere with a wiring work of the lead wire 34 at the time of assembling the air bag system including the inflator 10.

An gas outflow chamber 28 has an outer shell formed by a cylindrical housing (a second housing) 51, and it is welded and fixed to the first housing 51 of the diffuser portion 20 to make its opening portion cover the gas discharging hole 30. The first housing 51 and the second housing 52 may be formed integrally.

The gas outflow chamber 28 is formed in the axial direction of the inflator housing 12, and it has plural gas discharging holes 36 on a side surface thereof in a distal end portion side. These plural second gas discharging holes 36 are formed on the side surface of the gas outflow chamber 28 at equal intervals. Examples of such a formation are, in the widthwise cross sectional view, four holes at the angles of 90°, six holes at the angles of 60°, or eight holes at the angles of 45°. An odd number of the holes are also acceptable as long as they are formed at equal intervals.

By arranging the plural second gas discharging holes 36 at equal intervals in this manner, even when an inflator is actuated and the pressurized gas is ejected from the second gas discharging holes 36 due to a fire or the like during transportation to storage thereof, the inflator is prevented from jumping out like a rocket.

A screen 35 comprising a wire mesh or the like is arranged inside the gas outflow chamber 28 to cover the second gas discharging holes 36 from the inside. This screen 35 is to prevent broken pieces of the rupturable plate 29 from flowing into the air bag 50.

In the inflator 10, by arranging the inflator housing 12, and the gas introducing chamber 22, the igniter accommodating chamber 26 and the gas outflow chamber 28 which constituent the diffuser portion 20, as shown in FIG. 1, the central axes of the inflator housing 12 and the diffuser portion 20 (particularly, the gas outflow chamber 28) do not coincide with each other, but the distance between the two central axes becomes shorter, so that the whole size of the inflator 10 can be made compact.

The gas introducing chamber 22, the igniter accommodating chamber 26 and the gas outflow chamber 28 form the gas discharging passage, and the pressurized gas inside the inflator housing 12 passes through the gas introducing chamber 22 and then the igniter accommodating chamber to be discharged from the gas discharging hole 30, and it flows into the gas outflow chamber 28. Thereafter, the gas is discharged from the second gas discharging holes 36 through the screen 35 to inflate and develop the air bag 50 mounted to cover the second gas discharging holes 36.

(2) Embodiment 2

Figure 2:
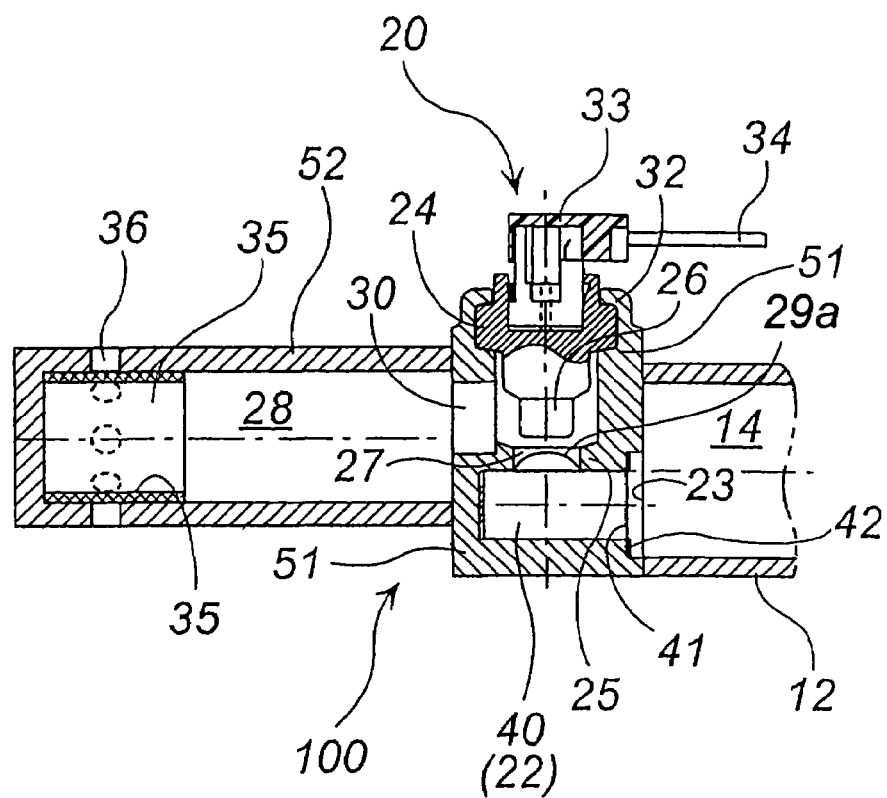
FIG. 2 is a sectional view of another embodiment of an inflator in the axial direction.

Another embodiment will be explained with reference to FIG. 2. FIG. 2 is a partial sectional view of an inflator 100 in the axial direction. The inflator 100 shown in FIG. 2 has a structure approximately identical to the inflator 10 shown in FIG. 1, and the same numerals as those in FIG. 1 indicate the same members in FIG. 2. The following is a description mainly with respect to a difference in structure from FIG. 1 and a difference in an advantageous effect due to the difference in structure.

In the gas introducing chamber 22, a cylindrical cup 40 with a bottom having the same outer shape as an inner shape of the gas introducing chamber 22 is inserted to have a closed end surface abutted against a closed end surface of the gas introducing chamber 22, so that an opening portion 41 of the cup is directed towards the inflator housing 12. The cup 40 is welded and fixed to the first housing 51 at a flange 42 provided at a peripheral edge of the opening portion.

Since the pressurized gas flows inside the cup 40, a portion in the side surface of the cup 40 which corresponds to a circular opening portion 27 inflates and deforms into a bowl-like shape to form a rupturable plate 29 closing the gas discharging passage (the circular opening portion 27) which communicates the igniter accommodating chamber 26 with the gas introducing chamber 22.

In the inflator 100, since the side surface of the cup 40 forms the rupturable plate 29, a mounting work of the rupturable plate is facilitated as compared with a case of welding and fixing a flat plate. In particular, the inner shape of the gas introducing chamber 22 and the shape of the cup 40 are identical to each other, the cup 40 is pressed by the pressurized gas to be hardly moved, and further, part of the side surface of the cup 40 forms the integrally formed rupturable plate 29. Therefore, sealing of the pressurized gas is made more securely as compared with a case of using a flat (for example, a disk) rupturable plate, and a fixing work is made easier.

In the inflator 100, by arranging the inflator housing 12, and the gas introducing chamber 22, the igniter accommodating chamber 26 and the gas outflow chamber 28 which constituent the diffuser portion 20, as shown in FIG. 2, the central axes of the inflator housing 12 and the diffuser portion 20 (particularly, the gas outflow chamber 28) do not coincide with each other, but the distance between the two central axes becomes shorter, so that the whole size of the inflator 100 can be made compact.

In the inflator 100, since the operation portion of the igniter 24 and the center (the apex of the projecting portion) of the rupturable plate 29 (the side surface of the cup 40) exactly oppose each other, a shock wave, a flame and a gas concentrate on the center of the rupturable plate 29 at the time of actuation of the igniter 24, and thereby, rupturability of the rupturable plate 29 becomes very high.

(3) Embodiment 3

Figure 3:
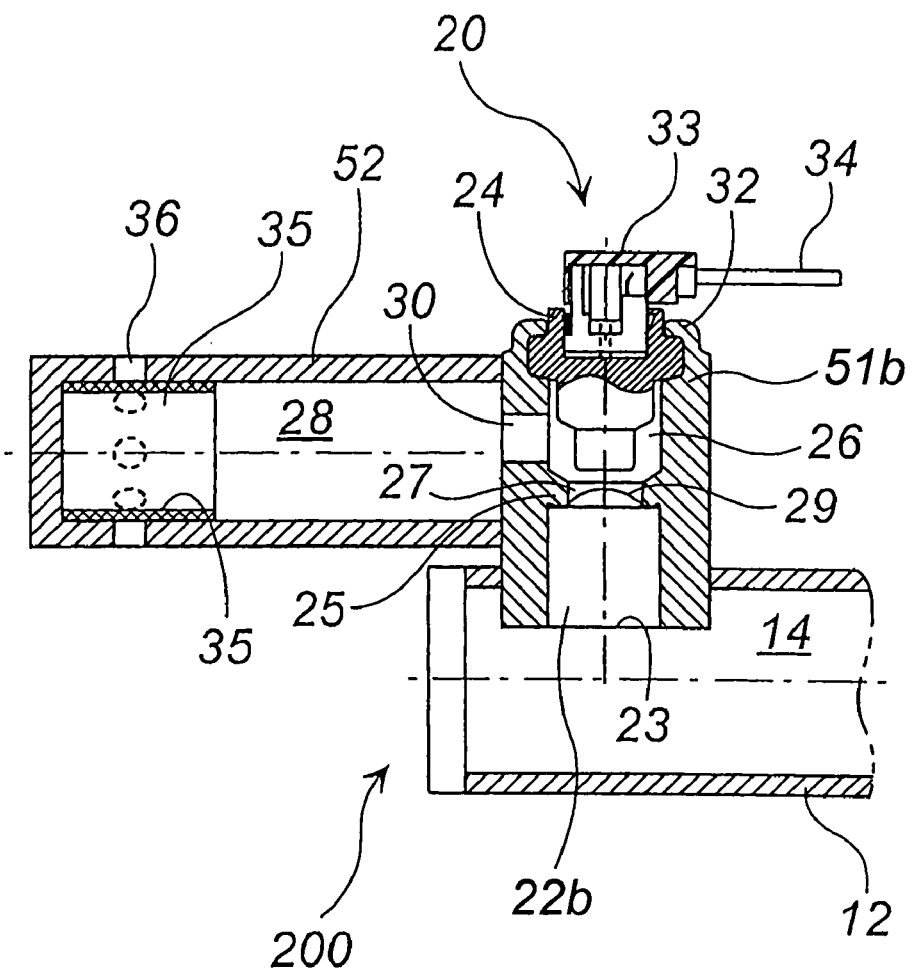
FIG. 3 is a sectional view of another embodiment of an inflator in the axial direction.

Another embodiment will be explained with reference to FIG. 3. FIG. 3 is a partial sectional view of an inflator 200 in the axial direction. The inflator 200 shown in FIG. 3 has a structure approximately identical to the inflator 10 shown in FIG. 1, and the same numerals as those in FIG. 1 indicate the same members in FIG. 3. The following is a description mainly with respect to a difference in structure from FIG. 1 and a difference in an advantageous effect due to the difference in structure.

Since a gas introducing chamber 22 is a cylindrical space formed in the direction orthogonal to the central axis of the inflator housing 12 and it is in communication with an inner space 14 at an opening portion 23, a pressurized gas flows into the gas introducing chamber 22.

The igniter accommodating chamber 26 is formed in the direction orthogonal to the axial direction of the inflator housing 12, and it has an opening portion for inserting an igniter 24 before mounting of the igniter 24.

A step portion 25 having a circular opening portion 27 is provided in a gas discharging passage between the gas introducing chamber 22 and the igniter accommodating chamber 26, and a disk-like rupturable plate 29 is welded and fixed to the step portion 25 in the gas introducing chamber 22 side. The rupturable plate 29 has a disk shape before mounting, but it deforms, after mounting, into a bowl-like shape projecting towards the igniter accommodating chamber 26 due to the pressure of the pressurized gas, as shown in the drawing. The apex of the projecting portion is the center of the rupturable plate 29, and a portion of the rupturable portion 29 which includes the center is ruptured at the time of actuation of the inflator 200 to open the closed gas discharging passage.

The rupturable plate 29 is inserted from the opening portion 23 of the gas introducing chamber 22 and a peripheral edge portion thereof is welded and fixed to the step portion 25. Since the circular opening portion 27 is closed by the rupturable plate 29, the pressurized gas is prevented from moving from the gas introducing chamber 22 to the igniter accommodating chamber 26 before actuation of the inflator 200.

In the inflator 200, since the gas introducing chamber 22 and the igniter accommodating chamber 26 are connected to each other in the same direction, the rupturable plate 29 can be inserted and fixed from the opening portion 23 of the gas introducing chamber 22, and thereby, an assembling work is facilitated. Further, by fixing the rupturable plate 29 from the gas introducing chamber 22 side in this manner, an peripheral portion of the welded and fixed rupturable plate 29 resists against the pressure of the pressurized gas, so that the rupturable plate 29 is prevented from peeling off due to decrease in a fixing strength of the rupturable plate 29 caused by the pressure of the pressurized gas.

In the inflator 200, by arranging the inflator housing 12, and the gas introducing chamber 22, the igniter accommodating chamber 26 and the gas outflow chamber 28 which constituent the diffuser portion 20, as shown in FIG. 3, the central axes of the inflator housing 12 and the diffuser portion 20 (particularly, the gas outflow chamber 28) do not coincide with each other, but the distance between the two central axes becomes shorter, so that the whole size of the inflator 200 can be made compact.

In the inflator 200, since the operation portion of the igniter 24 and the center (the apex of the projecting portion) of the rupturable plate 29 exactly oppose each other, a shock wave, a flame and a gas concentrate on the center of the rupturable plate 29 at the time of actuation of the igniter 24, and thereby, rupturability of the rupturable plate 29 becomes very high.

(4) Embodiment 4

Figure 4:
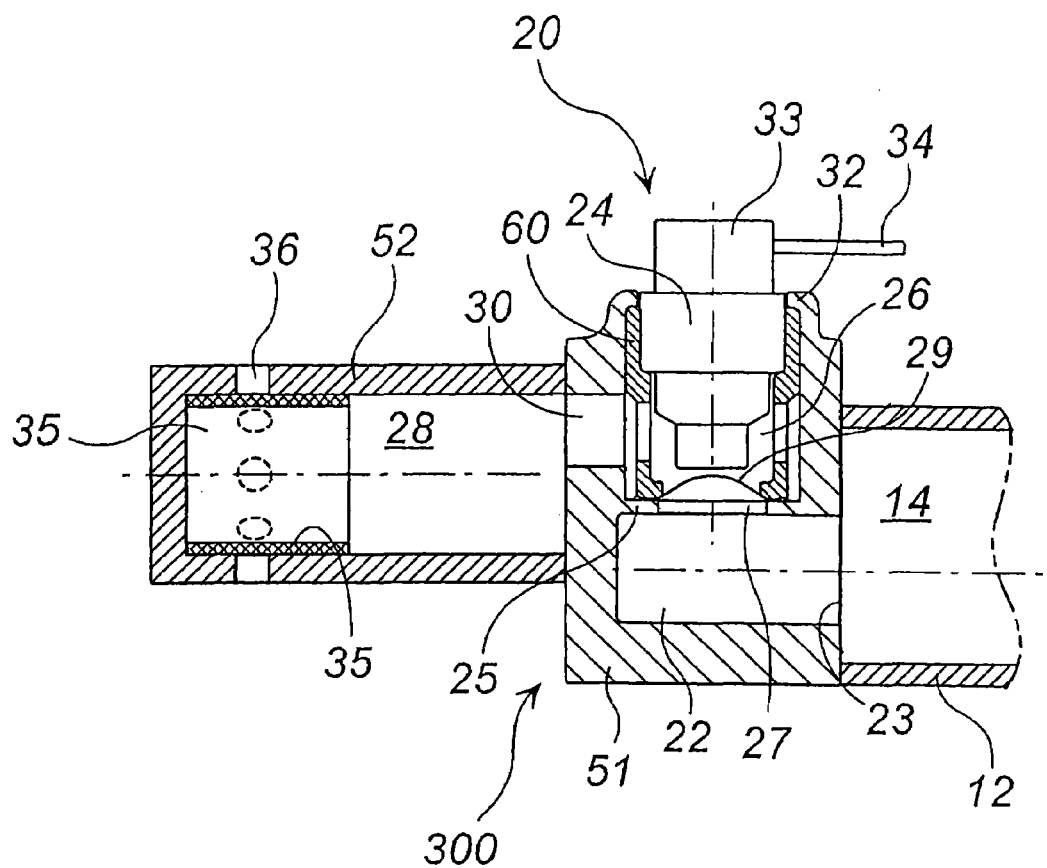
FIG. 4 is a sectional view of another embodiment of an inflator in the axial direction.
Figure 5:
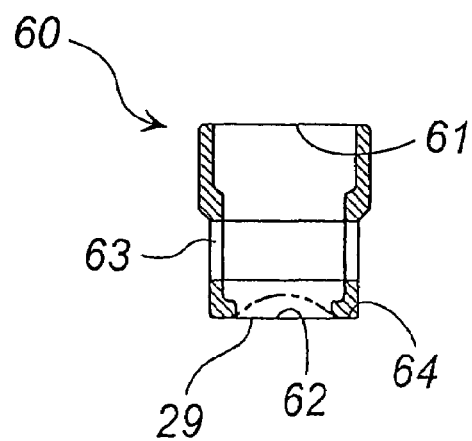
FIG. 5 is a vertical sectional view of a retainer used in FIG. 4.

Another embodiment will be explained with reference to FIG. 4 and FIG. 5. FIG. 4 is a partial sectional view of an inflator 300 in the axial direction, and FIG. 5 is a vertical sectional view of a retainer used in FIG. 4. An inflator 300 shown in FIG. 4 has a structure approximately identical to the inflator 10 shown in FIG. 1, and the same numerals as those in FIG. 1 indicate the same members in FIG. 4. The following is a description mainly with respect to a difference in structure from FIG. 1 and a difference in an advantageous effect due to the difference in structure.

An approximately cylindrical retainer 60 for holding an igniter 24 is inserted and fixed inside the igniter accommodating chamber 26. The retainer 60 has opening portions 61 and 62 at both ends, and has plural gas passing-through holes 63 serving as gas discharging passages.

The rupturable plate 29 is welded and fixed to an opening peripheral edge portion 64 of the retainer 60 in the opening portion 62 side from the outside of the retainer in a stage before inserting the retainer 60 in the igniter accommodating chamber 26, and when the retainer 60 is inserted into the igniter accommodating chamber 26, a peripheral edge portion of the rupturable plate 29 is pressed to abut against a step portion 25.

Since the rupturable plate 29 can be welded and fixed at the stage before inserting the retainer 60 into the igniter accommodating chamber 26 in this manner, a welding and fixing work can be made easier as compared with the respective inflators described above, and an assembling work is also made easier. Further, in addition to the welding and fixing, the peripheral edge portion is welded to the step portion 25 in a state that the peripheral edge portion is interposed between the peripheral edge 64 of the opening portion in the retainer 60 and the step portion 25, so that a resisting force against the pressure of the pressurized gas becomes particularly large, and the rupturable plate 29 is prevented from peeling off due to decrease in a fixing strength of the rupturable plate 29 caused by the pressure of the pressurized gas.

The retainer 60 inserted into the igniter accommodating chamber 26 with the rupturable plate 29 fixed, as shown in FIG. 4 is welded and fixed to the step portion 25 and the opening portion peripheral edge 64 (and a peripheral edge portion of the rupturable plate 29) by resistance-welding.

Since the circular opening portion 27 communicating the gas introducing chamber 22 with the igniter accommodating chamber 26 is closed by the rupturable plate 29, the pressurized gas is prevented from moving from the gas introducing chamber 22 to the igniter accommodating chamber 26 before actuation of the inflator 300. Further, an inner wall surface of the igniter accommodating chamber 26 and the retainer 60 are fixed closely to each other, so that the pressurized gas never leaks from the igniter accommodating chamber 26 to the outside the inflator 300 at the time of actuation.

In the inflator 300, by arranging the inflator housing 12, and the gas introducing chamber 22, the igniter accommodating chamber 26 and the gas outflow chamber 28 which constituent the diffuser portion 20, as shown in FIG. 4, the central axes of the inflator housing 12 and the diffuser portion 20 (particularly, the gas outflow chamber 28) do not coincide with each other, but the distance between the two central axes becomes shorter, so that the whole size of the inflator 300 can be made compact.

In the inflator 300, since the operation portion of the igniter 24 and the center (the apex of the projecting portion) of the rupturable plate 29 exactly oppose each other, a shock wave, a flame and a gas concentrate on the center of the rupturable plate 29 at the time of actuation of the igniter 24, and thereby, rupturability of the rupturable plate 29 becomes very high.

(5) Embodiment 5

Figure 6:
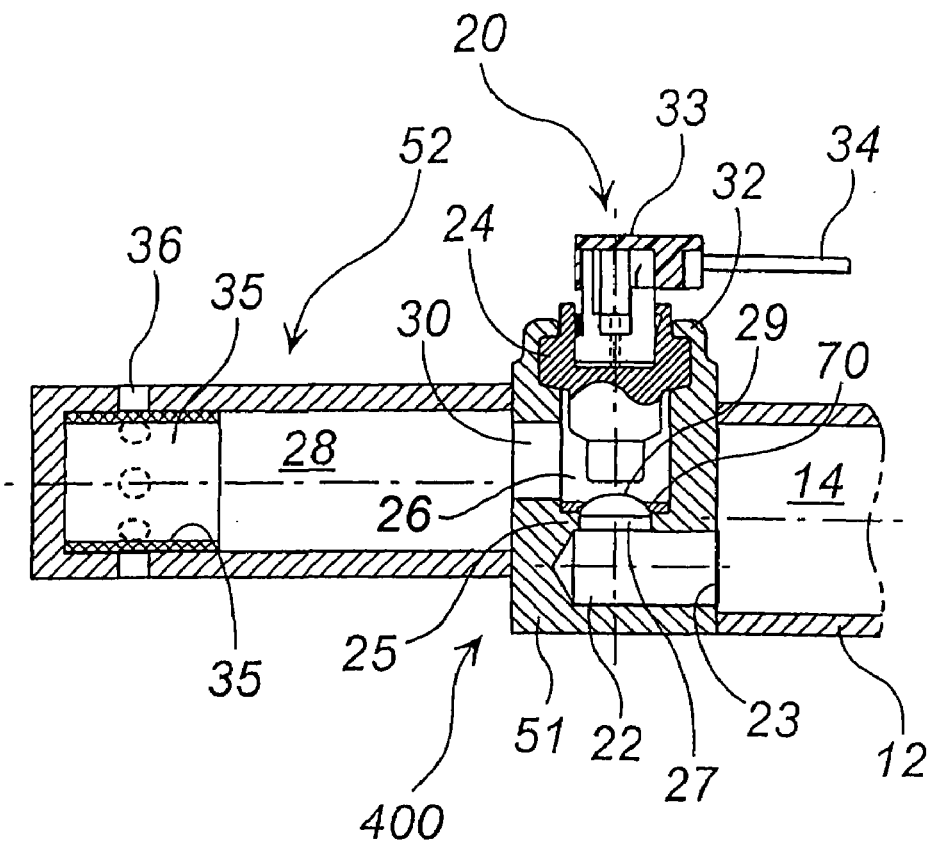
FIG. 6 is a sectional view of another embodiment of an inflator in the axial direction.
Figure 7:
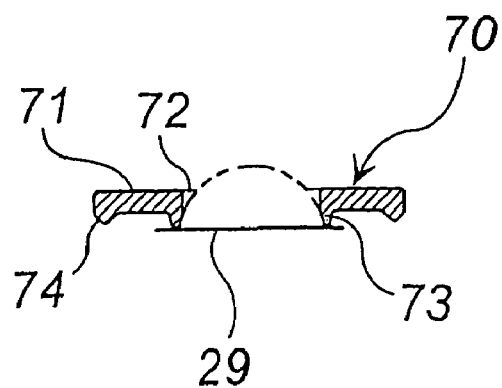
FIG. 7 is a sectional view of a rupturable plate mounted to a rupturable plate fixture used in FIG. 6.

Another embodiment will be explained with reference to FIG. 6 and FIG. 7. FIG. 6 is a partial sectional view of an inflator 400 in the axial direction, and FIG. 7 is a sectional view of an annular fixture used in FIG. 6. An inflator 400 shown in FIG. 6 has a structure approximately identical to the inflator 10 shown in FIG. 1, and the same numerals as those in FIG. 1 indicate the same members in FIG. 6. The following is a description mainly with respect to a difference in structure from FIG. 1 and a difference in an advantageous effect due to the difference in structure.

An annular fixture 70 has an annular portion 71 and a central hole 72, and it has, on one surface, an inner annular projecting portion 73 for welding a peripheral edge portion of the rupturable plate and an outer annular projecting portion 74 for welding and fixing the annular fixture 70.

The rupturable plate 29 is welded and fixed to the inner annular projecting portion 73 from the one surface of the annular fixture 70. The rupturable plate 29 has a disk-like shap before mounting, but after it is mounted to the igniter accommodating chamber 26, the rupturable plate 29 inflates and deforms as shown with a double dotted line due to the pressure of the pressurized gas.

The annular fixture 70 having the rupturable plate 29 welded and fixed is inserted from an opening portion of the igniter accommodating chamber 26 which is in communication with the outside of the inflator, and it is welded and fixed to the step portion 25 at the outer annular projecting portion 74. At that time, preferably, the annular fixture 70 is mounted to have the side in which the rupturable plate 29 mounted positioned in the gas introducing chamber 22 side, so that the rupurable plate 29 hardly peels off due to the pressure of the pressurized gas.

By welding the thin rupturable plate 29 before mounting to the inflator and welding the thick annular fixture 70 after inserting into the diffuser portion in this manner, a welding work is made easier as compared with a case of welding the rupturable plate after inserting into the diffuser portion.

In the inflator 400, by arranging the inflator housing 12, and the gas introducing chamber 22, the igniter accommodating chamber 26 and the gas outflow chamber 28 which constituent the diffuser portion 20, as shown in FIG. 4, the central axes of the inflator housing 12 and the diffuser portion 20 (particularly, the gas outflow chamber 28) do not coincide with each other, but the distance between the two central axes becomes shorter, so that the whole size of the inflator 400 can be made compact.

In the inflator 400, since the operation portion of the igniter 24 and the center (the apex of the projecting portion) of the rupturable plate 29 exactly oppose each other, a shock wave, a flame and a gas concentrate on the center of the rupturable plate 29 at the time of actuation of the igniter 24, and thereby, rupturability of the rupturable plate 29 becomes very high.

(6) Embodiment 6

Figure 8:
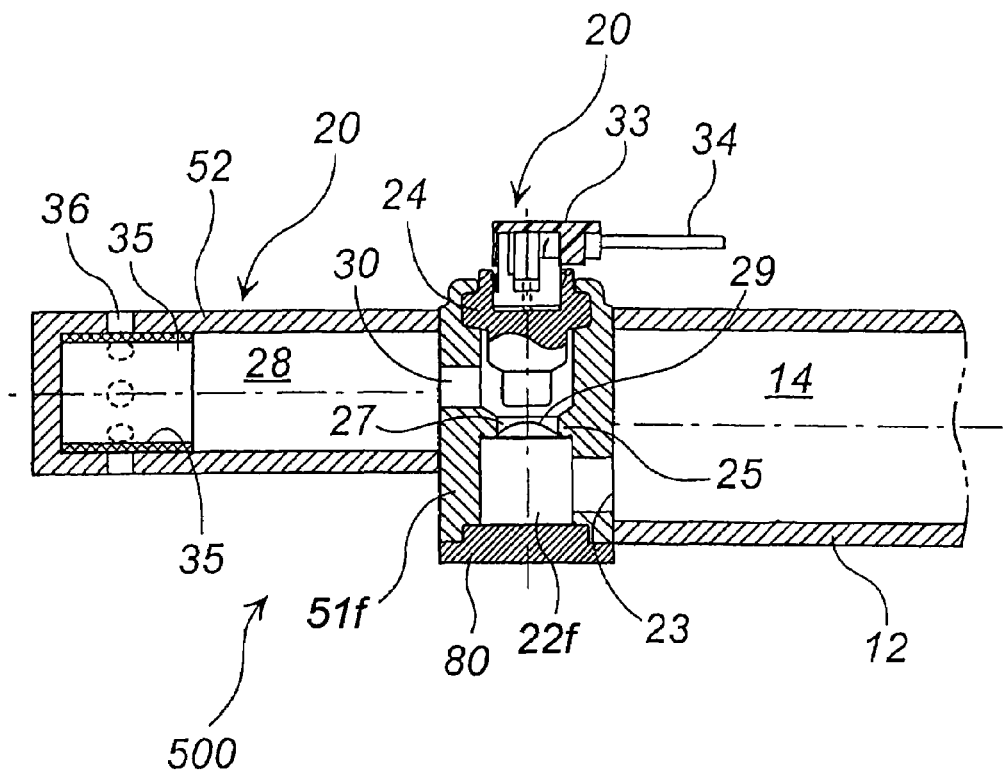
FIG. 8 is a sectional view of another embodiment of an inflator in the axial direction thereof.

Another embodiment will be explained with reference to FIG. 8. FIG. 8 is a partial sectional view of an inflator 500 in the axial direction. An inflator 500 shown in FIG. 8 has a structure approximately identical to the inflator 10 shown in FIG. 1, and the same numerals as those in FIG. 1 indicate the same members in FIG. 8. The following is a description mainly with respect to a difference in structure from FIG. 1 and a difference in an advantageous effect due to the difference in structure.

A mounting state of the rupturable plate 29 in an inflator 500 is similar to that in the inflator 200 shown in FIG. 3, but the inflator 500 is different in mounting procedure from the inflator 200 because of a difference in structure of the gas introducing chamber 22.

In FIG. 8, the gas introducing chamber 22 is in communication with only the inner space 14 at the opening portion 23. However, before mounting of the rupturable plate 29, the gas introducing chamber 22 is also in communication with the outside of the inflator, since the lid portion 80 is not attached and the gas introducing chamber 22 is opened.

The rupturable plate 29 is inserted from an opening portion of the gas introducing chamber 22 which is in communication with the outside of the inflator and it is welded and fixed at the step portion 25 in the same manner as the inflator 200 shown in FIG. 3. Then, after the opening portion is closed by the lid portion 80, the first housing 51 and the lid portion 80 are welded to each other, and the inside of the gas introducing chamber 22 is kept in an hermetic state.

With such a structure, the distance between the central axis of the inflator housing 12 and the centeral axis of the gas outflow chamber becomes still shorter as compared with the inflator 200 shown in FIG. 3, so that the whole size of the inflator can be made compact.

In the inflator 500, since the operation portion of the igniter 24 and the center (the apex of the projecting portion) of the rupturable plate 29 exactly oppose each other, a shock wave, a flame and a gas concentrate on the center of the rupturable plate 29 at the time of actuation of the igniter 24, and thereby, rupturability of the rupturable plate 29 becomes very high.

An air bag system using an inflator of the present invention is mounted as a system which uses each of the inflators shown in FIG. 1 to FIG. 4 and is combined with operation signal-outputting means comprising an impact sensor and a control unit, and a module case in which either of the inflators shown in FIG. 1 to FIG. 4 and an air bag are accommodated.

The inflator of the present invention can be applied to various inflators such as an air bag inflator for a driver side, an air bag inflator for a passenger side, an air bag inflator for a side collision, an inflator for a curtain air bag, an inflator for a knee-bolster, an inflator for an inflatable seat belt, an inflator for a tubular system and an inflator for a pretensioner.

The invention claimed is:

1. An inflator, comprising:
a cylindrical inflator housing having a first end that is closed and a second end defining an opening, and adapted to accommodate a pressurized gas therein, the cylindrical inflator housing extending in a longitudinal axial direction thereof;
a diffuser portion attached to the second end of the cylindrical inflator housing, the diffuser portion including,
a gas introducing chamber in communication with the cylindrical inflator housing through a first opening,
an igniter accommodating chamber for accommodating an igniter and in communication with the gas introducing chamber through a second opening, the igniter accommodating chamber having a third opening, for inserting the igniter, at a portion opposing the second opening, and
a gas discharging hole provided in a wall of the diffuser portion for discharging the pressurized gas, an imaginary center axis of the gas discharging hole being parallel to an imaginary center axis of the first opening, such that the pressurized gas is discharged in a direction parallel to the longitudinal axial direction of the cylindrical inflator housing; the diffuser portion defining therein a gas path extending from the first opening to the gas discharging hole; and
only a single rupturable plate provided within the diffuser portion and blocking the gas path prior to activation of the inflator,
wherein, the igniter accommodating chamber is freely in communication with an environment outside of the diffuser portion through the gas discharging hole prior to an activation of the inflator.

2. An inflator according to claim 1, wherein the single rupturable plate and the igniter are arranged such that an imaginary central axis of the single rupturable plate that penetrates a center of the single rupturable plate and an imaginary central axis of the actuating portion of the igniter towards which the output is discharged are coincident with each other.

3. An inflator according to claim 1, wherein the gas introducing chamber directs a flow of the pressurized gas along a longitudinal axial direction of the cylindrical inflator housing, and the igniter accommodating chamber directs the flow of the pressurized gas along a direction orthogonal to the longitudinal axial direction of the inflator housing,
wherein a center of the second opening coincides with a center of the third opening.

4. An inflator according to claim 1,
wherein, the single rupturable plate is a cylindrical cup inserted into the gas introducing chamber through the first opening, such that a side wall of the cylindrical cup opposes and closes the second opening.

5. An inflator according to claim 1, further comprising:
a cylindrical retainer for holding the igniter therein and adapted to be inserted into the igniter accommodating chamber through the third opening,
wherein, the single rupturable plate is attached to one end of the cylindrical retainer prior to an insertion of the cylindrical retainer through the third opening, such that the single rupturable plate closes the second opening once the cylindrical retainer is inserted into the igniter accommodating chamber.

6. An inflator according to claim 1, further comprising:
an annular fixture defining a central hole and adapted to be inserted into the ignition accommodating chamber through the third opening,
wherein the single rupturable plate is fixed to the annular fixture to cover the central hole, such that single the rupturable plate is sandwiched between the annular fixture and a surface defining the second opening to close the second opening once the annular fixture is inserted into the igniter accommodating chamber.

7. An inflator according claim 1, wherein the igniter is mounted in the igniter accommodating chamber, the inflator further comprising:
a lead wire connected to the igniter via a connector for transmitting an operation signal to the igniter,
wherein the lead wire extends in a direction perpendicular to an imaginary center axis of the second opening.

8. An inflator according to claim 1, further comprising:
a cylindrical diffuser housing having a first end defining an opening and a second end which is closed, the cylindrical diffuser housing having, in a peripheral wall thereof, a second gas discharging hole, the first end of the cylindrical diffuser housing being connected to the diffuser portion to cover the gas discharging hole and extends along a direction of an imaginary longitudinal central axis of the inflator housing to receive the pressurized gas discharged from the gas discharging hole and discharging the received pressurized gas through the second gas discharging hole.

9. An inflator according to claim 8, wherein a plurality of second gas discharging holes are formed in on a side wall of the cylindrical diffuser housing at equal intervals.

10. An inflator according to claim 9, wherein an air bag is connected to the cylindrical diffuser housing.

11. An air bag system comprising:
activation signal-outputting means including an impact sensor and a control unit; and
a module case accommodating an inflator according to claim 1 and an air bag.

12. An inflator according to claim 1, wherein the second opening is provided such that an imaginary center axis of the second opening is perpendicular to the longitudinal axial direction.

13. An inflator, comprising:
a cylindrical inflator housing having a first end that is closed and a second end defining an opening, and adapted to accommodate a pressurized gas therein, the cylindrical inflator housing extending in a longitudinal axial direction thereof;
a diffuser portion attached to the second end of the cylindrical inflator housing, the diffuser portion including,
a gas introducing chamber in communication with the cylindrical inflator housing through a first opening,
an igniter accommodating chamber for accommodating an igniter and in communication with the gas introducing chamber through a second opening, the igniter accommodating chamber having a third opening, for inserting the igniter, at a portion opposing the second opening, and
a gas discharging hole provided in a wall of the diffuser portion for discharging the pressurized gas, an imaginary center axis of the gas discharging hole being parallel to an imaginary center axis of the first opening, such that the pressurized gas is discharged in a direction parallel to the longitudinal axial direction of the cylindrical inflator housing; the diffuser portion defining therein a gas path extending from the first opening to the gas discharging hole; and only a single rupturable plate provided within the diffuser portion and blocking the gas path prior to activation of the inflator, wherein the diffuser portion is provided with a fourth opening communicating with the gas introducing chamber for inserting the single rupturable plate into the gas introducing chamber through the fourth opening, and a lid is provided to close the fourth opening.

14. An inflator, comprising:
a cylindrical inflator housing having a first end that is closed and a second end defining an opening, and adapted to accommodate a pressurized gas therein, the cylindrical inflator housing being longer in a longitudinal axial direction than in a radial direction thereof;
a diffuser portion attached to the second end of the cylindrical inflator housing, the diffuser portion including,
 a first opening closed by a single rupturable plate before activation of the inflator,
 an igniter accommodating chamber for accommodating an igniter therein, and
 a gas discharging hole provided in a wall of the diffuser portion and discharging the pressurized gas therethrough; and
a retainer attaching the single rupturable plate and provided within the diffuser portion and around the igniter such that the retainer directly attaches the igniter and the igniter accommodating chamber is isolated from the pressurized gas by the single rupturable plate before activation of the inflator.

15. An inflator according to claim 14, wherein the retainer is provided within the diffuser portion such that the igniter is surrounded by the retainer.

16. An inflator according to claim 14, wherein the igniter is provided within the retainer.

17. An inflator according to claim 14, wherein the retainer is provided within the diffuser portion such that the retainer is freely in communication with an environment outside of the diffuser portion thorough the gas discharging hole prior to activation of the inflator.

* * * * *